United States Patent
Charier et al.

(10) Patent No.: US 11,692,453 B2
(45) Date of Patent: Jul. 4, 2023

(54) AIRCRAFT TURBINE ENGINE EQUIPPED WITH AN ELECTRICAL MACHINE

(71) Applicant: SAFRAN AIRCRAFT ENGINES, Paris (FR)

(72) Inventors: Gilles Alain Marie Charier, Moissy-Cramayel (FR); Caroline Marie Frantz, Moissy-Cramayel (FR); Loïc Paul Yves Guillotel, Moissy-Cramayel (FR); Vincent François Georges Millier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/287,072

(22) PCT Filed: Oct. 22, 2019

(86) PCT No.: PCT/FR2019/052500
§ 371 (c)(1),
(2) Date: Apr. 20, 2021

(87) PCT Pub. No.: WO2020/084241
PCT Pub. Date: Apr. 30, 2020

(65) Prior Publication Data
US 2021/0355840 A1    Nov. 18, 2021

(30) Foreign Application Priority Data
Oct. 26, 2018    (FR) ........................................ 1859942

(51) Int. Cl.
*F01D 15/10* (2006.01)
*F02C 7/32* (2006.01)
(Continued)

(52) U.S. Cl.
CPC ................ *F01D 15/10* (2013.01); *F02C 7/32* (2013.01); *F02K 3/06* (2013.01); *H02K 7/1823* (2013.01);
(Continued)

(58) Field of Classification Search
CPC . F02C 7/32; F02C 7/265; F02C 7/268; H02K 7/1823; F02K 3/06; F05D 2220/76; F05D 2220/323; F01D 15/10
See application file for complete search history.

(56) References Cited

U.S. PATENT DOCUMENTS

| | | | |
|---|---|---|---|
| 3,264,482 A | 8/1966 | Clark et al. | |
| 7,224,082 B2 * | 5/2007 | Bouiller | F02C 7/268 290/52 |

(Continued)

FOREIGN PATENT DOCUMENTS

| | | |
|---|---|---|
| EP | 1382802 A1 | 1/2004 |
| FR | 2842565 A | 1/2004 |
| FR | 2922265 A1 | 4/2009 |

OTHER PUBLICATIONS

Hubbard, "Aeroacoustics of Flight Vehicles: Theory and Practice: vol. 1:Noise Sources." NASA RP 1258, vol. 1 WRDC Technical Report 90-3052, Aug. 1991, p. 189. (Year: 1991).*

(Continued)

*Primary Examiner* — Todd E Manahan
*Assistant Examiner* — David P. Olynick
(74) *Attorney, Agent, or Firm* — Christensen O'Connor Johnson Kindness PLLC

(57) ABSTRACT

An aircraft turbine engine includes a gas generator and a fan arranged upstream from the gas generator and configured to generate a main gas flow, one portion of which flows in a flow path of the gas generator to form a primary flow, and another portion of which flows in a flow path around the gas (Continued)

generator to form a secondary flow. The gas generator includes a low-pressure compressor that includes a rotor driving the fan. The turbine engine further includes an electric machine. The electric machine includes a rotor rotated by the rotor of the low-pressure compressor, and a stator extending around the rotor of the electric machine and configured to be cooled by the primary flow.

13 Claims, 3 Drawing Sheets

(51) Int. Cl.
    *F02K 3/06*     (2006.01)
    *H02K 7/18*     (2006.01)
    *H02K 9/14*     (2006.01)

(52) U.S. Cl.
    CPC ......... *H02K 9/14* (2013.01); *F05D 2220/323* (2013.01); *F05D 2220/76* (2013.01); *F05D 2260/232* (2013.01); *F05D 2260/30* (2013.01)

(56) References Cited

U.S. PATENT DOCUMENTS

| | | | | |
|---|---|---|---|---|
| 9,148,040 | B2* | 9/2015 | Anthony | H02K 1/185 |
| 11,067,003 | B2* | 7/2021 | Stevenson | H02K 7/1823 |
| 2004/0070211 | A1 | 4/2004 | Franchet et al. | |
| 2015/0218965 | A1* | 8/2015 | Juh | F02C 3/107 |
| | | | | 29/888.021 |
| 2018/0163558 | A1* | 6/2018 | Vondrell | B64D 27/24 |
| 2019/0145322 | A1* | 5/2019 | Sellick | F02C 7/36 |
| | | | | 290/52 |
| 2019/0264706 | A1* | 8/2019 | Awtry | F02C 3/06 |

OTHER PUBLICATIONS

Kin S. Yeung, "Analysis of a new concept in spline design for transmission output shafts," Transactions on Modelling and Simulation vol. 22, © 1999 WIT Press, www.witpress.com, ISSN 1743-355X (Year: 1999).*

Written Opinion of the International Searching Authority dated Feb. 5, 2020, issued in corresponding International Application No. PCT/FR2019/052500, filed Oct. 22, 2019, 6 pages.

International Preliminary Report on Patentability dated Apr. 27, 2021, issued in corresponding International Application No. PCT/FR2019/052500, filed Oct. 22, 2019, 1 page.

International Search Report dated Feb. 5, 2020, issued in corresponding International Application No. PCT/FR2019/052500, filed Oct. 22, 2019, 2 pages.

Written Opinion of the International Searching Authority dated Feb. 5, 2020, issued in corresponding International Application No. PCT/FR2019/052500, filed Oct. 22, 2019, 5 pages.

* cited by examiner

AIRCRAFT TURBINE ENGINE EQUIPPED WITH AN ELECTRICAL MACHINE

TECHNICAL FIELD

Embodiments of the present disclosure relate to an aircraft turbine engine equipped with an electrical machine.

BACKGROUND

The prior art comprises in particular the documents FR-A1-2 842 565, FR-A1-2 922 265 and EP-A1-1 382 802 which describe a turbine engine equipped with an electrical machine.

The aeronautical world is now asking many questions about the relevance of using hybrid engines for commercial aviation. The use of electrical energy is now being considered not only for aircraft functions but also to electrify the functions of the turbine engine.

This observation has led to the study of hybrid engine architecture solutions, combining fossil fuel energy and electrical energy to ensure the drive of the propulsion part (fan of the turbine engine) and the engine supply of certain engine and/or aircraft functions.

These architectures can be based on a high bypass ratio and reduction gear type architecture, but also on a multiple body (2 or 3) architecture. In these architectures, the turbine engine comprises a low-pressure body and a high-pressure body, each body comprising a shaft connecting a rotor of a compressor to a rotor of a turbine.

It is known to equip an aircraft turbine engine with an electrical machine. It is reminded that an electrical machine is an electromechanical device based on electromagnetism allowing the conversion of electrical energy into work or mechanical energy, for example. This method is reversible and can be used to produce electricity.

Thus, depending on the final use of a machine, we use the terms of:
- generator for designating an electrical machine producing electrical energy from mechanical energy,
- motor for designating an electrical machine producing mechanical energy from electrical energy.

An electrical machine can also behave as a motor as well as a generator.

The integration of a high-powered electrical machine on the low-pressure body of a turbine engine, in particular of the high bypass ratio type, is very complex. Several installation zones are possible but the advantages and the disadvantages of each are numerous and diverse (problem of mechanical integration of the machine, temperature resistance of the machine, accessibility of the machine, etc.).

One of the major problems of the integration of an electrical machine into a turbine engine is to have an environment capable of accepting the limited temperature of its components (around 150° C.). In addition, as the overall efficiency of the machine being necessarily less than 100%, the heat released by the losses must be removed. On machine sizes of more than 1 MW, the power dissipated is then significant (50 KW minimum). One solution would be to cool the stator of the machine with oil. However, if the machine is in an oil enclosure, the oil may leak directly into the enclosure with the risk of pollution by particles from the machine. If the machine is in a dry environment, then the cooling system must be sealed and it must be possible to recover any leaks. The oil cooling therefore has its disadvantages.

The present disclosure provides a solution to at least some of the above problems.

SUMMARY

Embodiments of the present disclosure propose an aircraft turbine engine, comprising a gas generator and a fan arranged upstream from the gas generator and configured to generate a main gas flow, one part of which flows into a duct of the gas generator to form a primary flow, and another part of which flows in a duct around the gas generator to form a secondary flow, the gas generator comprising a low-pressure body which comprises a rotor driving the fan, the turbine engine further comprising an electrical machine, characterised in that the electrical machine comprises a rotor rotated by the rotor of the low-pressure body, and a stator extending around the rotor of the electrical machine, this stator being surrounded by a first annular shroud which is itself surrounded by a second annular shroud, these first and second shrouds delimiting between them a portion of the flow duct of the primary flow, and the first annular shroud being configured to cool the by conduction stator as a result of its sweep by the primary flow.

The present disclosure thus offers a solution for integrating an electrical machine, a first advantage being related to the fact that, in the integration zone of this machine, the temperatures prevailing therein are relatively low and therefore optimal for this machine. In addition, the machine is cooled by the primary flow, which optimises the service life of the machine. The electrical machine is preferably located outside any lubricating oil enclosure of a bearing, so that there is no risk of pollution by the oil of this machine.

The turbine engine according to the disclosure may comprise one or more of the following characteristics, taken in isolation from each other or in combination with each other:
- the electrical machine is located upstream of a low-pressure compressor of the low-pressure body,
- the electrical machine is located downstream of a low-pressure compressor of the low-pressure body,
- the turbine engine comprises an inlet casing which surrounds the reduction gear and which is located upstream of the electrical machine,
- the first shroud has a downstream end attached or connected to means for guiding in rotation an annular row of variable pitch vanes of the low-pressure compressor,
- the first shroud has a radially outer annular surface which has an aerodynamic profile and which is swept by the primary flow,
- the stator is attached to a first annular bearing support which extends at least partially radially inwardly of the stator and which defines with the stator an annular space for mounting the rotor,
- the rotor is attached to or connected to the outer periphery of an annular member of generally T or C shape axial section, this member comprising an inner periphery which is coupled to the rotor of the low-pressure body by an intermediate shaft passing axially through the electrical machine, at least one bearing being mounted between the first bearing support and the inner periphery of the member, or between the first bearing support and the intermediate shaft,
- the inner periphery of the member is clamped axially against a trunnion of the rotor of the low-pressure body, the member and the trunnion being mounted adjacently on the intermediate shaft which is guided by at least two bearings, the bearing of which carried by the first bearing support, as well as another bearing carried by a second annular bearing support attached to a casing, the gas generator comprises a low-pressure body which comprises a rotor driving the fan by means of a mechanical reduction gear and which comprises a low-pressure compressor situated upstream of an intermediate casing, the turbine engine also comprising an electrical machine, the electrical machine is mounted coaxially downstream of the reduction gear and upstream of the intermediate casing.

The present disclosure further relates to a method of modular assembly of a turbine engine as described above, comprising at least one step of mounting a first module comprising a plurality of assembled elements, on a second module. This method may comprise the steps of:

(a) assembling the electrical machine, the first bearing support and the member, and (b) mounting this assembly and the trunnion on the intermediate shaft.

DESCRIPTION OF THE DRAWINGS

The disclosure will be better understood and further details, characteristics and advantages of the disclosure will become apparent from the following description made by way of non-limiting example with reference to the attached drawings, in which.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figures 1, 2:
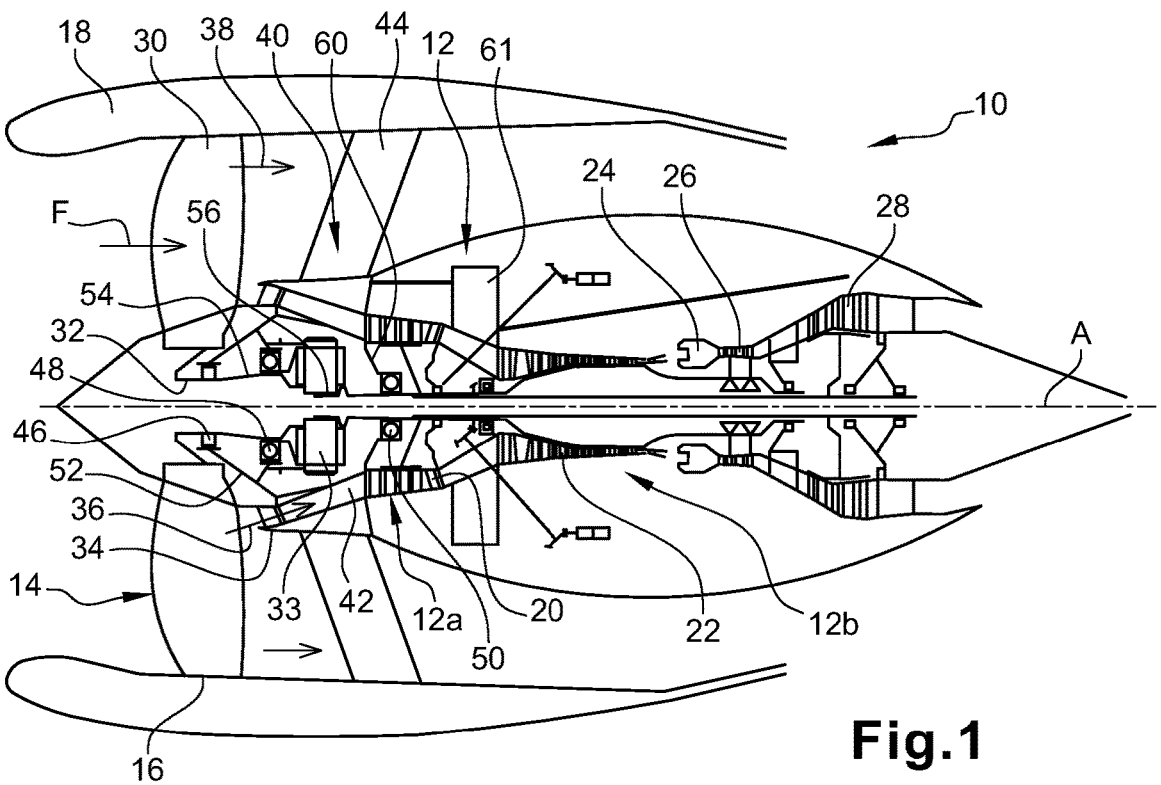
FIG. 1 is a schematic axial sectional view of an aircraft turbine engine with a high bypass ratio and reduction gear.
FIG. 2 is a partial schematic axial sectional half-view of an aircraft turbine engine according to the disclosure equipped with an electrical machine.

We first refer to FIG. 1 which schematically represents an aircraft turbine engine 10 with double-body and double-flow.

The turbine engine 10 conventionally comprises a gas generator 12, upstream of which is arranged a fan 14. The fan 14 is surrounded by a fan casing 16 which is surrounded by a nacelle 18 which extends around and along a major part of the gas generator 12.

The gas generator 12 comprises here two bodies, namely a low-pressure body 12a or LP and a high pressure body 12b or HP. Each body comprises a compressor and a turbine.

The terms "upstream" and "downstream" are considered along a main direction F of gas flow in the turbine engine 10, this direction F being parallel to the longitudinal axis A of the turbine engine.

From upstream to downstream, the gas generator 12 comprises one low-pressure compressor 20, one high-pressure compressor 22, one combustion chamber 24, one high-pressure turbine 26 and one low-pressure turbine 28.

The low-pressure compressor 20 and the high-pressure compressor 22 are separated from each other by an intermediate casing 61.

The fan 14 comprises an annular row of vanes 30 rotated by a fan shaft 32 which is connected to the rotor of the low-pressure body 12a via a reduction gear 33. The gas flow which passes through the fan (arrow F) is separated upstream of the gas generator 12 by an annular nozzle 34 into a radially inner annular flow, referred to as the primary flow 36 which supplies the gas generator 12, and a radially outer annular flow, referred to as the secondary flow 38 which flows between the gas generator 12 and the nacelle 18 and supplies most of the thrust of the turbine engine.

An inlet casing 40 structurally connects the gas generator 12 to the fan casing 16 and the nacelle 18. As with the intermediate casing 61, the inlet casing 40 comprises an annular row of radially inner arms 42 extending into the primary flow 36, and an annular row of radially outer guide vane 44 (OGV type) extending into the secondary flow 38. The arms 42 are generally limited in number (less than ten) and are tubular and have auxiliaries passing through them. The number of vanes 44 (OGV) is generally greater than ten.

The rotor of the low-pressure body 12a and the fan shaft 32 are guided upstream by bearings 46, 48 and 50. These bearings 46, 48, 50 are of the ball or roller type and each comprise an inner ring mounted on the shaft to be guided, an outer ring carried by an annular bearing support and a bearing between the rings.

In a known manner, the reduction gear 33 is of the epicyclic type and comprises a sun gear centred on the axis A, a ring gear extending around the axis and planet gears which mesh with the sun gear and the ring gear and are carried by a planet gear carrier.

In the example shown, the ring gear 33b is stationary and fixedly connected to a support 52 of the bearings 46, 48. The planet carrier is rotatable and connected to an output shaft 54 of the reduction gear which further comprises an input shaft 56 meshed with the sun gear. The input shaft 56 is coupled to the main shaft 70 of the low-pressure body, and the output shaft 54 is coupled to the fan shaft 32.

The input shaft 56 is guided by the bearing 50 which is carried by a bearing support 60 (FIG. 1). The output shaft 54 is guided by the bearings 46, 48.

The bearing supports 52, 60 extend around the axis A and are stationary parts connected to the stator and for example to the input casing 40.

FIG. 2 is a larger scale view of a part of a turbine engine and illustrates an installation zone of an electrical machine 62, this zone Z being located here downstream of the reduction gear 33 and upstream of the intermediate casing 61.

This annular zone Z is delimited radially on the inside by the main shaft 70 of the low-pressure body 12a and by the input shaft 56 of the reduction gear 33, and radially on the outside by the elements which delimit internally the flow duct I of the primary flow 36. These elements comprise, from upstream to downstream, an internal annular wall 66a, an annular shroud 64a, then the discs 72a of the wheels 72 and the internal platforms 74a of the bladed rectifiers 74 of the low-pressure compressor 20.

The wall 66a surrounds the reduction gear 33 and forms part of the inlet casing 40 as it is connected to the radially inner ends of the arms 42 whose radially outer ends are connected to another outer annular wall 66b. The shroud 64a extends around the electrical machine 62 and in the extension of the wall 66a.

The shroud 64a is an inner shroud and is surrounded by an outer shroud 64b, the shrouds 64a, 64b defining between them a portion of the flow duct I of the primary flow 36 downstream of the inlet casing 40 and upstream of the low-pressure compressor 20 and the intermediate casing 61. The shroud 64b extends from the downstream end of the wall 66b to a wall 20a which surrounds the wheels 72 and the rectifiers 74 of the low-pressure compressor 20. The shroud 64b may be connected to or formed integrally with this wall 20a.

Classically, this wall 20a comprises, on the one hand, means 76 for guiding in rotation and for varying the pitch of the vanes of the rectifiers 74 about substantially radial axes, and abradable annular coatings 78 surrounding the wheels 72.

Figure 3:
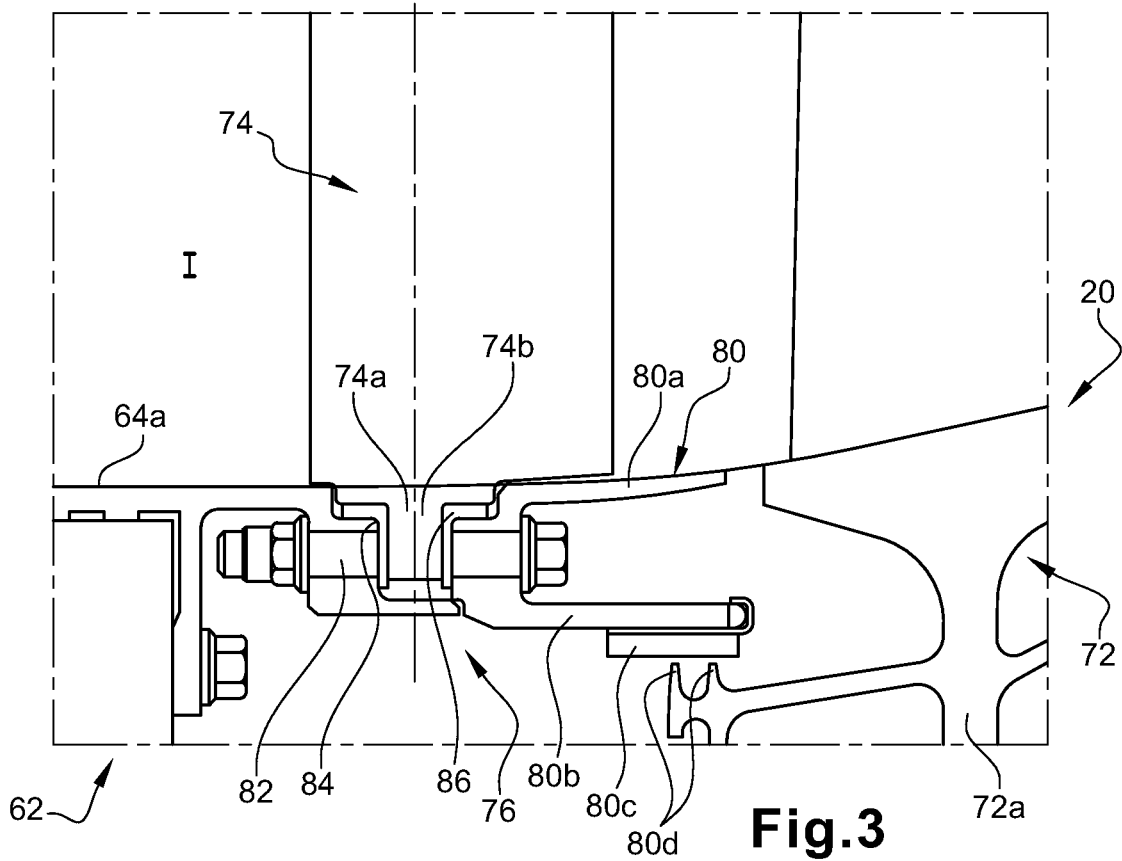
FIG. 3 is a larger scale view of a detail of FIG. 2.

The shroud 64a has its downstream end which is also connected or attached to means 76 for rotationally guiding the vanes of rectifiers 74 about the same axes. As can be seen more clearly in FIG. 3, an annulus 80 is added and attached to the downstream end of the shroud 64a by an annular series of substantially axially extending screws 82. The shroud 64a and the annulus 80 form one of the aforementioned platforms 74a and define between them radially oriented cylindrical housings 84 for receiving and guiding radially inner cylindrical pivots 74b of the vanes of rectifiers 74. The pivot of each vane may be guided in this housing 84 by a cylindrical sleeve 86 which may be held radially in the housing by means of screws 82 for example.

The annulus 80 is generally C-shaped in axial section with an axially oriented opening. This annulus 80 comprises a substantially cylindrical outer peripheral rim 80a which extends in the extension of the shroud 64a and defines the duct I internally, and a substantially cylindrical inner peripheral rim 80b which carries an annular coating 80c made of an abradable material intended to cooperate with lips 80d carried by the disc 72a of the upstream wheel of the compressor 20.

The discs 72a of the wheels 72 of the compressor 20 are attached to a trunnion 88 which is driven by the shaft 70 via an intermediate shaft 90 (FIG. 2).

The trunnion 88 is annular in shape and has a general T-shape in axial section. The trunnion 88 comprises a radial annular leg 88a whose inner periphery is connected to a cylindrical leg 88b. The outer periphery of the radial leg 88a is secured by screws to flanges of the discs 72a of the wheels 72, and the cylindrical leg 88b comprises internal splines 88c for coupling to external splines of the intermediate shaft 90.

The intermediate shaft 90 is generally tubular in shape and comprises an upstream section 90a and a downstream section 90b. The trunnion 88 is mounted on the downstream section 90b of the intermediate shaft 90, this downstream section 90b comprising internal splines 90c for coupling to external splines of the main shaft 70, as well as a cylindrical shoulder 90d for axial support towards the downstream of the trunnion 88 and in particular of the downstream end of its cylindrical leg 88b. The intermediate shaft 90 may further comprise an external cylindrical surface 90e for centring the leg 88b and thus the trunnion 88.

The upstream section 90a of the intermediate shaft 90 extends around the downstream end of the input shaft 56 of the reduction gear 33. This input shaft 56 comprises internal splines 56a for coupling with external splines of the main shaft 70. Furthermore, a nut 92 is axially clamped at the upstream end of the main shaft 70 and is axially supported on the input shaft 56 to clamp it axially against the intermediate shaft 90 which itself is axially supported on a cylindrical shoulder 70a of the main shaft 70.

At its downstream end, the intermediate shaft 90 carries the inner ring 50a of the bearing 50, in this case a ball bearing, whose outer ring 50b is carried by the bearing support 60. This support 60 has a generally frustoconical shape and is flared axially downstream. Its larger diameter downstream end is attached to the intermediate casing 61.

This type of bearing 50 is typically lubricated and is located in an annular lubrication enclosure which is sealed to prevent any oil leakage, particularly upstream, in the zone Z of implantation of the electrical machine 62.

The machine 62 has a generally annular shape and comprises a rotor 62a and a stator 62b which surrounds the rotor 62a. The rotor 62a has a generally cylindrical shape extending about the axis A and is attached to an annular member 94 also extending about the axis A.

The member 94 is generally T-shaped in axial section. The member 94 comprises a radial annular leg 94a whose inner periphery is connected to a cylindrical leg 94b. The outer periphery of the radial leg 94a is attached by screws to the rotor 62a, and the cylindrical leg 94b comprises internal splines 94c for coupling to external splines of the intermediate shaft 90, and in particular of its upstream section 90a.

The downstream end of the cylindrical leg 94b is, on the one hand, axially supported on the upstream end of the cylindrical leg 88b of the trunnion 88, and, on the other hand, cooperates with the cylindrical centring surface 90e carried by the intermediate shaft 90.

A nut 96 is axially tightened at the upstream end of the intermediate shaft 90 and is supported axially on the member 94 to urge it axially against the trunnion 88.

At its upstream end, the cylindrical leg 94b of the member 94 carries an inner ring 98a of a bearing 98, here with rollers, the outer ring 98b of which is carried by another annular bearing support 100. This support 100 has a generally frustoconical shape and is flared axially upstream. Its larger diameter upstream end is attached to the stator 62b of the electrical machine 62.

The stator 62b is also generally cylindrical in shape. It comprises at its upstream end a radially inner annular flange for attachment of a plurality of flanges, one 100a of which is of the bearing support 100. The flange 62ba of the stator 62b is also attached to a flange 40a of the inlet casing 40, as well as to flanges of sealing covers 102 and/or deflectors.

The inner periphery of the bearing support 100 may be provided with an oil film damping system 104, known as a squeeze-film. It may further comprise a downstream facing cylindrical rim 100b and comprising an internal annular coating of abradable material.

Two annular sealing covers 106 may be attached to the member 94 and in particular to its radial leg 94a, and carry radially external annular lips intended to cooperate on the one hand with the coating carried by the rim 100b, as well as with a similar coating carried by one of the covers 102 attached to the flange 62ba of the stator 62b.

The bearing 98 is conventionally lubricated and is located in an annular lubrication enclosure which is sealed to prevent any oil leakage in particular downstream, in the zone Z of implantation of the electrical machine 62.

The stator 62b is connected by an electric cable 107 to a control circuit, this cable 107 passing here through a tubular arm 42 of the inlet casing 40.

One of the particularities of this installation lies in the fact that the electrical machine 62 and in particular its stator 62b is located as close as possible to the primary flow 36. This enables, on the one hand, to have an electrical machine 62 with a large diameter and therefore with a higher potential power than the technologies proposed up to now, and on the other hand, to have a machine which is cooled by the primary flow 36. In a particular embodiment of the disclosure, 30 KW could be dissipated by this cooling.

To this end, the shroud 64 which extends, preferably directly, around the stator 62b, has its radially outer surface swept by the flow 36 and may additionally have an aerodynamic profile, as shown in the drawing. The shroud 64a ensures the heat exchange by thermal conduction between the stator 62b and the flow 36.

The idea is to have a shroud 64a which acts as a thermal interface between the air of the primary duct and the stator 62b of the electrical machine 62. The stator of the electrical machine is composed of windings that need to be ducted to protect them from the environment. Here, it is proposed that the mechanical protective frame of the casing be combined with an aerodynamic function of the turbine engine and possibly with a support function of the rectifier located downstream.

Figure 4:
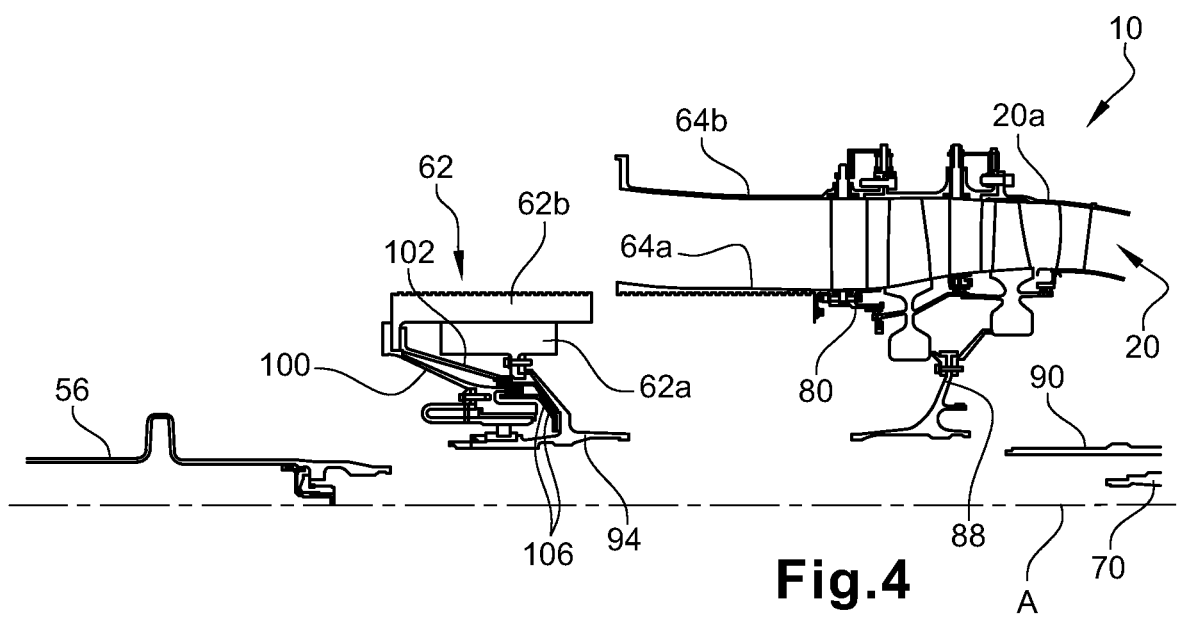
FIG. 4 is a partial schematic axial sectional view of the electrical machine and the turbine engine of FIG. 2, and illustrates steps of an assembly method according to the disclosure.

FIG. 4 illustrates steps for the assembly of the turbine engine 10 and in particular of modules of this turbine engine.

A first step illustrated in FIG. 4 consists of assembling the machine 62, i.e. inserting the rotor 62a into the stator 62b, by first fixing the bearing support 100 to the stator 62b, and the member 94 to the rotor 62a. The covers 102, 106 may also be attached to this assembly.

The shroud 64a can then be mounted around the machine 62 and the module so formed can be attached to the compressor 20, in particular by attaching the downstream end of the shroud 64a to the annulus 80. The shroud 64b is already pre-mounted on the wall 20a of the compressor 20, or formed in one piece with this wall 20a.

In the event that the shroud 64b is formed in one piece with the wall 20a, a part of the outer casing of the low-pressure compressor 20 thus extends without an opposing inner compressor casing, which is replaced by the shroud 64a of the electrical machine.

The machine 62 and the compressor 20 can then be engaged on the intermediate shaft 90 which is previously mounted on the main shaft 70 or subsequently mounted on this main shaft 70. The trunnion 88 of the compressor 20 is coupled with the intermediate shaft 90 and then the member 94 is coupled with this intermediate shaft and is axially supported on the trunnion 88. The nut 96 clamps the member 94 and the trunnion 88 against the shoulder 90d of the intermediate shaft.

The input shaft 56 of the reduction gear 33 is then engaged by axial translation from upstream to downstream between the shaft 70 and the intermediate shaft 90. The input shaft 56 is coupled with the main shaft 70 and the nut 96 is tightened to axially lock the input shaft 56 and the intermediate shaft 90 to the main shaft 70.

Figure 5:
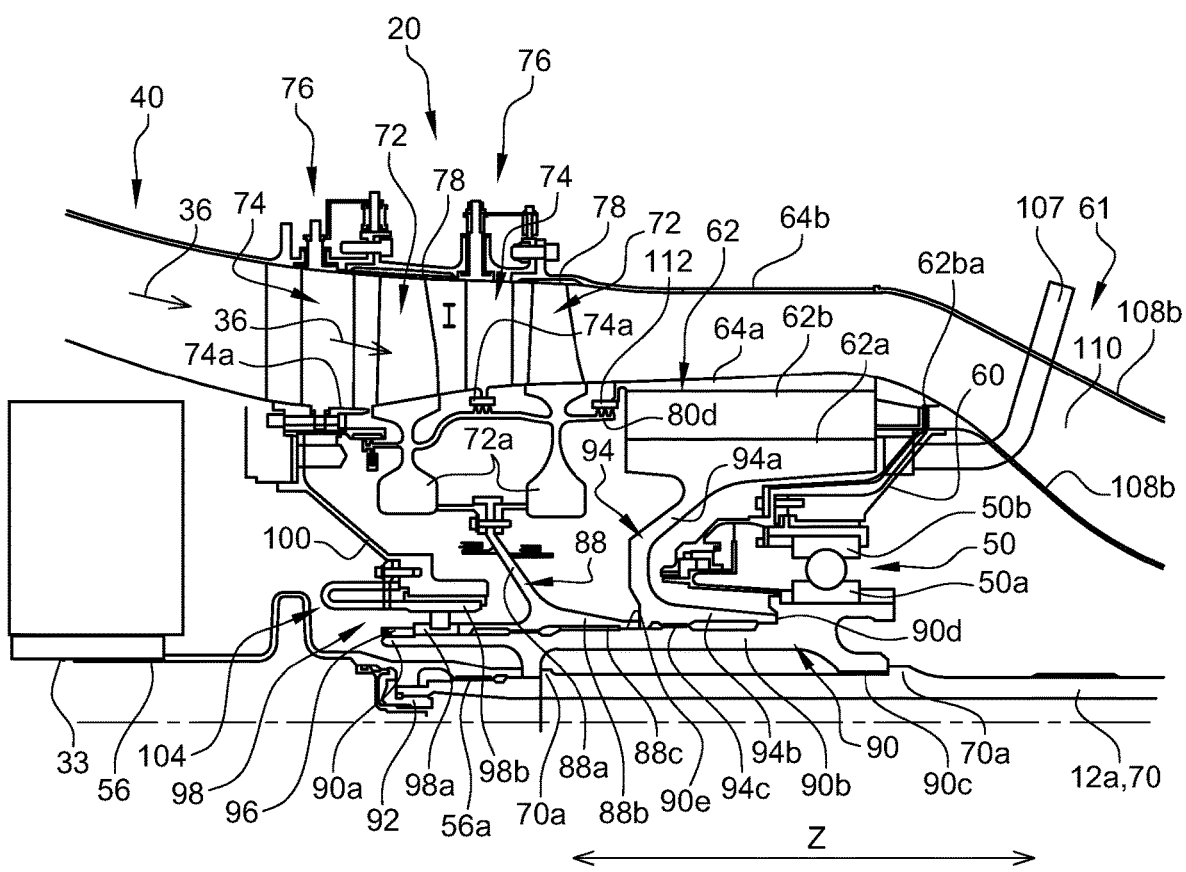
FIG. 5 is a partial schematic axial sectional half-view of an aircraft turbine engine according to an embodiment of the disclosure.

FIG. 5 illustrates an alternative embodiment of a turbine engine according to the disclosure.

The elements described in the preceding and which are found in this variant embodiment are designated by the same references.

The zone Z of implantation of the electrical machine 62 is situated downstream of the reduction gear 33 and the compressor 20, and upstream of the intermediate casing 61.

This annular zone Z is delimited radially on the inside by the main shaft 70 of the low-pressure body 12a as well as by the input shaft 56 of the reduction gear 33, and radially on the outside by the elements which delimit internally the flow duct I for the primary flow 36. These elements comprise here, from upstream to downstream, the discs 72a of the wheels 72 and the internal platforms 74a of the bladed rectifiers 74 of the low-pressure compressor 20, the annular shroud 64a, and then an internal annular wall 108a.

The wall 108a forms part of the intermediate casing as it is connected to the radially inner ends of arms 110 whose radially outer ends are connected to another outer annular wall 108b. The shroud 64a extends around the electrical machine 62 and into the extension of the discs 72a of the wheels 72 and the internal platforms 74a of the bladed rectifiers 74 of the compressor 20.

The shroud 64a is an inner shroud and is surrounded by an outer shroud 64b, the shrouds 64a, 64b defining between them a portion of the flow duct I of the primary flow 36 downstream of the low-pressure compressor 20 and upstream of the intermediate casing 61. The shroud 64b extends from the downstream end of the wall 20a to an outer annular wall 108b which is connected to the radially outer ends of the arms 110 and thus forms part of the intermediate casing 61. The shroud 64b may be connected to or formed in one piece with the wall 20a.

Classically, this wall 20a comprises, on the one hand, means 76 for guiding in rotation and for variable pitch of the vanes of the rectifiers 74 about substantially radial axes, and abradable annular coatings 78 surrounding the wheels 72.

The shroud 64a comprises at its upstream end a cylindrical rim 112 oriented upstream and carrying an annular coating of abradable material intended to cooperate with lips 80d carried by the disc 72a of the downstream compressor wheel 20.

The discs 72a of the wheels 72 of the compressor 20 are attached to a trunnion 88 which is driven by the shaft 70 via an intermediate shaft 90.

The trunnion 88 is annular in shape and has a generally T-shaped axial section. The trunnion 88 comprises a radial annular leg 88a whose inner periphery is connected to a cylindrical leg 88b. The outer periphery of the radial leg 88a is secured by screws to flanges of the discs 72a of the wheels 72, and the cylindrical leg 88b comprises internal splines 88c for coupling to external splines of the intermediate shaft 90.

The intermediate shaft 90 is generally tubular in shape and comprises an upstream section 90a and a downstream section 90b. The trunnion 88 is mounted on the upstream section 90a of the intermediate shaft 90, the shaft 90 comprising internal splines 90c for coupling to external splines of the main shaft 70. The intermediate shaft 90 may further comprise an outer cylindrical surface 90e for centring the leg 88b and thus the trunnion 88.

The input shaft 56 of the reduction gear 33 comprises internal splines 56a for coupling with external splines of the main shaft 70. Furthermore, a nut 92 is axially clamped at the upstream end of the main shaft 70 and is axially supported on the input shaft 56 to axially clamp it against the trunnion 88 which itself is axially supported on a cylindrical shoulder 70a of the main shaft 70.

At its downstream end, the intermediate shaft 90 carries the inner ring 50a of the bearing 50, in this case a ball bearing, whose outer ring 50b is carried by the bearing support 60. This support 60 has a generally frustoconical shape and is flared axially downstream. Its larger diameter downstream end is attached to the intermediate casing 61.

This type of bearing 50 is typically lubricated and is located in an annular lubrication enclosure which is sealed to prevent any oil leakage, particularly upstream, in the zone Z of implantation of the electrical machine 62.

The machine 62 has a generally annular shape and comprises a rotor 62a and a stator 62b which surrounds the rotor 62a. The rotor 62a has a generally cylindrical shape extending about the axis A and is connected to an annular member 94 also extending about the axis A.

The member 94 has a general T- or C-shape in axial section. The member 94 comprises a radial annular leg 94a whose inner periphery is connected to a cylindrical leg 94b. The outer periphery of the radial leg 94a is connected to the rotor 62a, and the cylindrical leg 94b comprises internal splines 94c for coupling to external splines of the intermediate shaft 90, and in particular of its downstream section 90b.

The downstream end of the cylindrical leg 94b is on the one hand axially supported on a cylindrical shoulder 90d of the intermediate shaft 90, and its upstream end is axially supported upstream on the downstream end of the trunnion 88. This upstream end of the leg 94b cooperates and on the other hand with the cylindrical centring surface 90e carried by the intermediate shaft 90.

A nut 96 is axially tightened at the upstream end of the intermediate shaft 90 and is axially supported on the trunnion 88 to urge it axially against the member 94.

At its upstream end, the intermediate shaft 90 carries an inner ring 98a of a bearing 98, here with rollers, the outer ring 98b of which is carried by another annular bearing support 100. This support 100 has a generally frustoconical shape and is flared axially upstream. Its larger diameter upstream end is attached to the inlet casing 40.

The stator 62b is also generally cylindrical in shape. It comprises at its downstream end an annular flange 62ba for attachment of a plurality of flanges, one of which is of the shroud 108a. The flange 62ba of the stator 62b is also attached to a flange of the bearing support 60.

The inner periphery of the bearing support 60 may be equipped with an oil film damping system 104, known as a squeeze-film.

The bearing 98 is typically lubricated and is located in an annular lubrication enclosure which is sealed to prevent any oil leakage particularly downstream in the zone Z of implantation of the electrical machine 62.

The stator 62b is connected by an electric cable 107 to a control circuit, this cable 107 passing here through a tubular arm 110 of the intermediate casing 61.

As in the previous embodiment, the shroud 64a which extends, preferably directly, around the stator 62b, has its radially outer surface swept by the flow 36 and may further have an aerodynamic profile, as shown in the drawing. The shroud 64a ensures the heat exchange by thermal conduction between the stator 62b and the flow 36.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An aircraft turbine engine comprising:
a gas generator;
a fan arranged upstream from the gas generator and configured to generate a main gas flow, one part of which flows into a duct of the gas generator to form a primary flow, and another part of which flows in a duct around the gas generator to form a secondary flow, the gas generator comprising a low-pressure body that comprises a rotor for driving the fan via a mechanical reduction gear;
an electrical machine mounted coaxially downstream of the reduction gear and upstream of an intermediate casing, the electrical machine including a rotor rotated by the rotor of the low-pressure body, and a stator, having an upstream end and a downstream end, extending around the rotor of the electrical machine;
a first annular shroud, which is surrounded by a second annular shroud, the first and second shrouds delimiting between them a portion of said duct of the primary flow wherein the first annular shroud is mounted around the electrical machine and extending directly around the stator of the electrical machine and wherein, between the upstream end and the downstream end, the stator abuts a radially inner surface of the first annular shroud, so that the first annular shroud has its radially outer surface swept by the primary flow of gases so as to cool said stator with aid of the primary flow.

2. The turbine engine according to claim 1, wherein the electrical machine is located upstream of a low-pressure compressor of the low-pressure body.

3. The turbine engine according to claim 1, wherein the electrical machine is located downstream of a low-pressure compressor of the low-pressure body.

4. The turbine engine according to claim 3, wherein said first shroud has a downstream end attached or connected to means for guiding in rotation an annular row of variable pitch vanes of the low-pressure compressor.

5. The turbine engine according to claim 1, wherein the stator is attached to a first annular bearing support which extends at least partially radially inwardly of the stator and which defines therewith an annular space for mounting the rotor of the electrical machine.

6. The turbine engine according to claim 5, wherein the rotor of the electrical machine is attached to or connected to the outer periphery of an annular member having a T-shaped or C-shaped axial section, the member comprising an inner periphery which is coupled to the rotor of the low-pressure body by an intermediate shaft passing axially through the electrical machine, at least one bearing being mounted between said first bearing support and the inner periphery of the member, or between said first bearing support and the intermediate shaft.

7. The turbine engine according to claim 6, wherein the inner periphery of the member is clamped axially against a trunnion of the rotor of the low-pressure body, the member and the trunnion being mounted adjacently on said intermediate shaft which is guided by at least two bearings, a first bearing of the at least two bearings being carried by said first bearing support and a second bearing of the at least two bearings being carried by a second annular bearing support attached to a casing.

8. A method of modular assembly of a turbine engine according to claim 1, comprising at least one step of mounting a first module comprising a plurality of assembled elements on a second module.

9. The method according to claim 8, wherein the stator of the electrical machine is attached to a first annular bearing support which extends at least partially radially inwardly of the stator and which defines therewith an annular space for mounting the rotor of the electrical machine, the rotor of the electrical machine being attached to or connected to the outer periphery of an annular member having a T-shaped or C-shaped axial section, the member comprising an inner periphery which is coupled to the rotor of the low-pressure body by an intermediate shaft passing axially through the electrical machine, at least one bearing being mounted between said first bearing support and the inner periphery of the member, or between said first bearing support and the intermediate shaft, wherein the method further comprises assembling the electrical machine, the first bearing support and said member, and mounting said assembly and said trunnion on said intermediate shaft.

10. An aircraft turbine engine comprising:

a gas generator;

a fan arranged upstream from the gas generator and configured to generate a main gas flow, one part of which flows into a duct of the gas generator to form a primary flow, and another part of which flows in a duct around the gas generator to form a secondary flow, the gas generator comprising a low-pressure body that comprises a main shaft for driving the fan via a mechanical reduction gear;

said low pressure body further comprising a low pressure compressor having wheels provided with discs which are attached to a trunnion which is connected to an intermediate shaft connected to the main shaft, an electrical machine mounted coaxially downstream of the reduction gear and upstream of an intermediate casing, the electrical machine including a rotor connected to the intermediate shaft, and a stator, having an upstream end and a downstream end, extending around the rotor of the electrical machine;

a first annular shroud, which is surrounded by a second annular shroud, the first and second shrouds delimiting between them a portion of said duct of the primary flow, wherein the first annular shroud is mounted around the electrical machine and extends directly around the stator of the electrical machine, and wherein, between the upstream end and the downstream end, the stator abuts a radially inner surface of the first annular shroud, so that the first annular shroud has its radially outer surface swept by the primary flow of gases so as to cool said stator with aid of the primary flow.

11. The aircraft turbine engine according to claim 10, wherein the rotor of the electrical machine is attached to annular member which is connected to the intermediate shaft by splines.

12. The aircraft turbine engine according to claim 10, wherein the trunnion is connected to the intermediate shaft by splines.

13. The aircraft turbine engine according to claim 10, wherein the intermediate shaft is connected to the main shaft by splines.

* * * * *